Oct. 21, 1958  E. C. LIGHT  2,857,536
VARIABLE RELUCTANCE MACHINE
Filed July 18, 1955  2 Sheets-Sheet 1
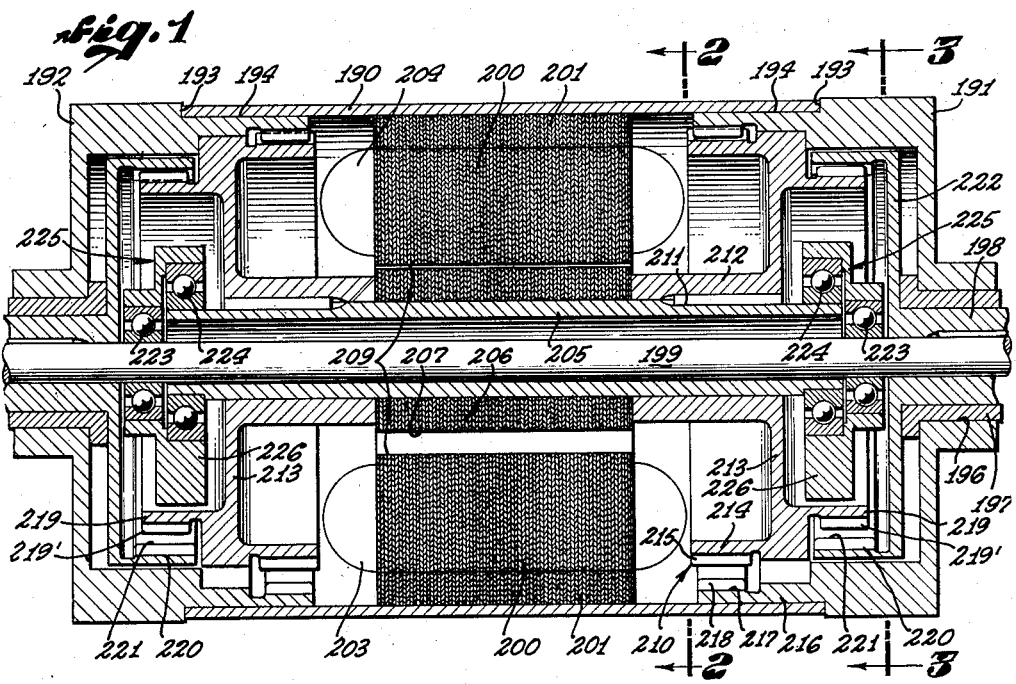
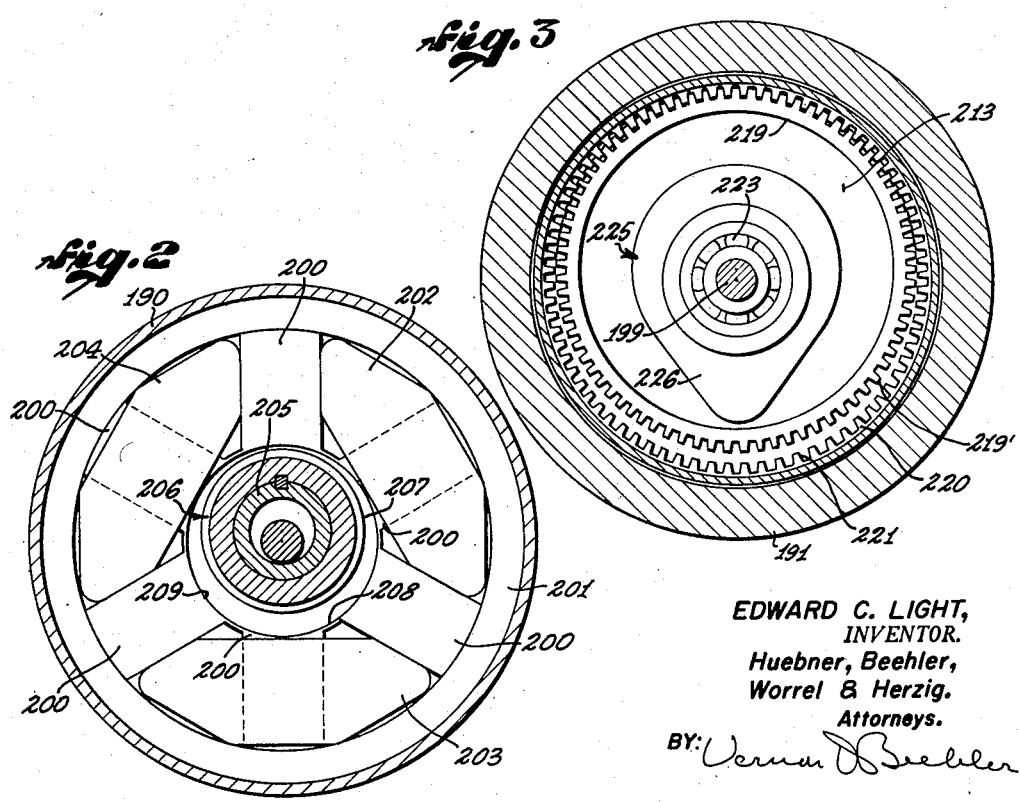
EDWARD C. LIGHT,
INVENTOR.
Huebner, Beehler,
Worrel & Herzig.
Attorneys.

Oct. 21, 1958
E. C. LIGHT
2,857,536
VARIABLE RELUCTANCE MACHINE
Filed July 18, 1955
2 Sheets-Sheet 2
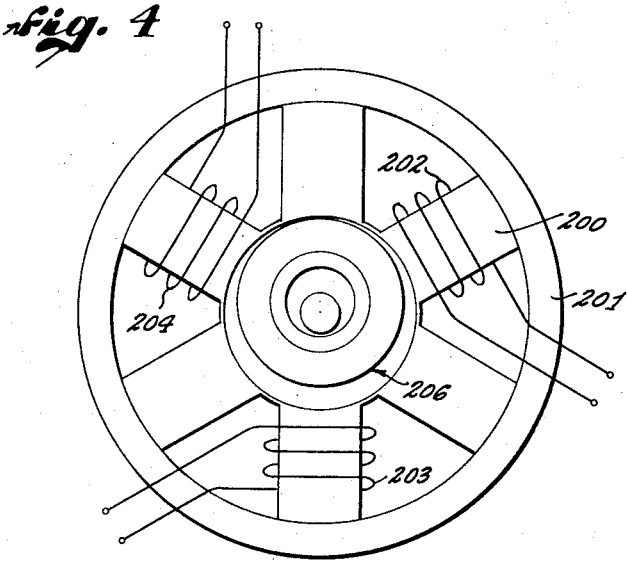
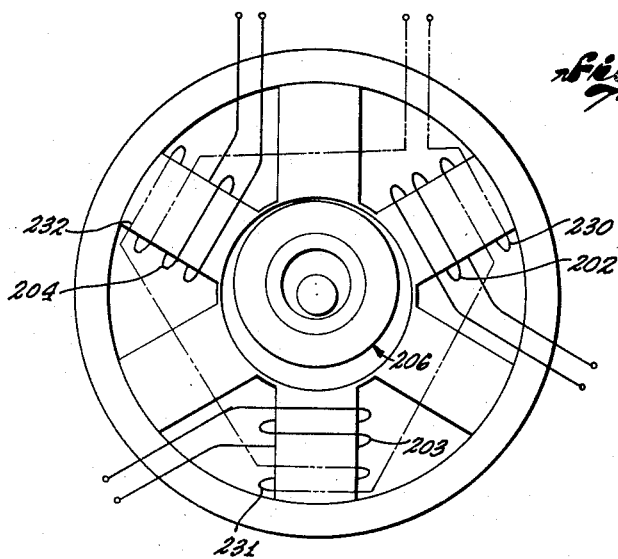
EDWARD C. LIGHT,
INVENTOR.
Huebner, Beehler,
Worrel & Herzig.
Attorneys.

United States Patent Office 2,857,536
Patented Oct. 21, 1958

2,857,536

VARIABLE RELUCTANCE MACHINE

Edward C. Light, Tarzana, Calif.

Application July 18, 1955, Serial No. 522,650

4 Claims. (Cl. 310—82)

The invention relates to variable reluctance machines and may be said to contemplate motors, generators, and converters.

The conventional electro-mechanical machine whether a motor or generator is a somewhat complex device which through a long period of development has reached a high degree of perfection in certain respects.

There are, however, certain limitations in conventional motors and generators which have long been recognized. Although electrically actuated machinery operates with a high degree efficiency at an especially high rate of rotation, most mechanical devices driven thereby need to be operated at considerably less revolutions per minute. Consequently, for a great many installations gear reducers need to be employed and the installation is burdened with the expense of such additional equipment. Moreover, the difference in rates of rotation which needs to be compensated for often necessitates the focusing of an unnecessary great amount of attention on speed changing mechanisms.

Although reduction down in revolutions per minute is the chief requisite in employing many electric motors, conversely where a prime mover is mechanically actuated for the purpose of generating electricity, a speed change upwardly in revolutions per minute becomes desirable and presents comparable problems.

Among the objects of the invention therefore is to produce a new and improved variable reluctance machine which takes special advantage of the effectiveness of an extremely rapid electrical rotation and which at the same time produces or incorporates into the machine a relatively small mechanical rotation thereby to substantially minimize the number and variety of mechanical rotating parts.

Another object of the invention is to provide a new and improved variable reluctance machine which incorporates a principle involving the eccentric rotation of a shaft operating within a magnetic field whereby to exhibit an extremely rapid electrical rotational effect and which at the same time is accompanied by a relatively low rate of rotation mechanically, there being associated with the eccentrically rotating element a concentrically rotating shaft joined thereto in such fashion that the eccentric movement is erased at the junction of the two rotating elements.

Still another object of the invention is to provide a new and improved variable reluctance machine in the form of a generator whereby when the input shaft is rotated as rapidly as possible by operation of an appropriate prime mover, the electrical rotation will be multiplied many times so that the electrical output will be at a rate far greater than would be possible by any conventional rotating shaft driven directly by a prime mover.

Still further among the objects of the invention is to provide a new and improved alternator which is extremely simple in its construction and design and which is capable of directly converting multi-phase alternating current input into rotational energy without the employment of extra facilities to change the initial speed of rotation to a readily usable slower speed of rotation at the output, or on the drive shaft of the machine.

Still further among the objects of the invention is to provide a new and improved eccentric shaft principle whereby direct input to a concentrically rotating shaft can be translated to eccentric movement in an eccentrically rotating shaft so mounted with respect to electric coils and magnetic loops that electric power output meeting normal requirements can be generated by mechanical energy input wherein a shaft rotates at a particularly low rate of rotation.

With these and other objects in view, the invention consists in the contruction, arrangement and combination of the various parts of the device whereby the objects contemplated are attained, as hereinafter set forth, pointed out in the appended claims and illustrated in the accompanying drawings.

In the drawings:

Figure 1 is a longitudinal sectional view of a form of the device usable with alternating current as a motor.

Figure 2 is a cross-sectional view taken on the line 2—2 of Figure 1 showing the location of the coil windings particularly in the form of a three-phase winding.

Figure 3 is a cross-sectional view taken on the line 3—3 of Figure 1 illustrating the transfer of power from an eccentrically driven motor shaft to a concentrically driven drive shaft.

Figure 4 is a schematic diagram showing the three-phase A. C. windings of the device of Figure 1.

Figure 5 is a schematic diagram incorporating the D. C. field windings in the device of Figure 1.

In the form of device illustrated in Figures 1 through 5, inclusive, the eccentric principle is applied to an A. C. motor. Presumably, although the description is here applicable to an A. C. motor, a reversal of the flow of electricity at least so far as general principles are concerned will make the device operable as an alternating current generator. Only the A. C. motor will be described, however, as to express details.

As shown in Figure 1, the motor comprises a motor casing 190 cylindrical in form and provided with end plate structures 191 and 192. Each end plate structure has a shoulder 193 at the end of a recess 194 for reception of the appropriate end of the casing. A central boss is built on the exterior of each end plate structure provided with a bore 196 within which is located a bushing 197 serving as a bearing for a bearing hub 198 of the motor drive shaft assembly. A connecting shaft 199 interconnects the bearing hubs at the opposite ends of the machine. The connecting shaft is keyed to the bearing hub by appropriate conventional means.

To convert A. C. current to rotational energy there is provided a series of pole pieces 200 numbering six in all. The pole pieces are connected together at their outer ends by a continuous pole piece core 201, thereby providing a magnetic loop complete except for a gap at the inner ends of the pole pieces. Alternate pole pieces are wound each with a coil carrying reference characters 202, 203 and 204, these being coils for a three-phase electric motor.

Figures 1 and 2 reveal that the motor shaft assembly comprises a hollow shaft 205 upon which is mounted a core sleeve 206 of laminated magnetic metal. The core sleeve has an exterior surface 207 slightly smaller in diameter than the diameter of a circle 208 defined by curved inner ends 209 of the pole pieces 200.

Non-rotatably secured to the hollow shaft 205 at each of the portions thereof immediately adjacent the ends of the core sleeve is a gear member indicated generally by the reference character 210. Keys 211 fitting in suitable keyways secure a hub 212 of the gear member to the hollow shaft. A web 213 of the gear member supports at its outermost perimeter a ring gear 214 having a specified number of teeth 215. Immediately surrounding the ring gear is a flange 216 of the end plate structure 191. On the inner surface of the flange 216 is a ring gear 217 having teeth 218 numbering one or two teeth more than the number of teeth 215 in the ring gear 214. The ring gear 217 is slightly greater in diameter at the apexes of the teeth than the diameter of the ring gear 214 to provide a desired eccentricity. The eccentricity will correspond to the eccentricity between the pole piece core and the surface surrounding it taking into consideration the circle of contact of the teeth. By providing ring gears intermeshing at the area described, there will be no slippage of the motor shaft when it is driven during motor operation by the electromagnetic energy imparted through the core sleeve 206.

On the opposite side of the gear member 210 there is an external ring gear 218 of diameter smaller than the ring gear 214. This ring gear is provided with teeth 219 of a specified number. A surrounding internal ing gear 220 of diameter greater than the ring gear 218 is provided with teeth 221.

As clearly seen in Figure 3 there will be more teeth 221 than teeth 219 and the circumference of the ring gear 220 will be greater than the circumference of the ring gear 218 to accommodate the eccentricity already referred to. The ring gear 220 is carried by a disk 222 which extends outwardly from and is part of the bearing hub 198.

A bearing 223 on each end mounts the connecting shaft 199 for concentric rotation and hence serves to mount the drive shaft assembly. A second bearing 224 mounts the hollow shaft 205. Both bearings are carried in a bearing support indicated generally by the reference character 225. One side of the bearing support consists of a counter-weight 226. It will be noted that the counter-weight 226 is on the opposite side of the bearing support from the axis and hence the weight of the motor shaft assembly built around the hollow shaft 205.

Figure 4 shows a three-phase A. C. winding without employment of a D. C. field winding. In Figure 24 the A. C. coils are indicated by the reference characters 202, 203 and 204. Pole pieces 200 correspond to those indicated in Figures 21 and 22 as does also the pole piece core 201.

In Figure 5 there are shown in addition to the A. C. coils a series of D. C. coils 230, 231 and 232. These D. C. coils are wound about the same pole pieces as are the A. C. coils, the intermediate pole pieces being left without coils. The D. C. fields set up by the D. C. coils are adapted to facilitate starting of the motor.

As the A. C. current alternates and shifts from one phase to another, the respective coils are energized and de-energized, creating a succession of magnetic loops traveling about the electrical structure. Creation of magnetic fields by the alternating current in the sequence described causes the core sleeve 206 to be moved in an eccentric path. Eccentric movement will be accompanied by rotation about the axis of the motor shaft assembly. Inasmuch as ring gears 214 and 217 are in mesh on the side of the machine where the magnetic flux linkage is taking place, the gear member 210 will be forced to rotate in response to the application of electric energy in the form of magnetism or, in other words, electromagnetic energy. Since the gear member 210 is rotating, the ring gear 219 is also rotating. Meshing of the ring gear 219 with the ring gear 220 causes the ring gear 220 to rotate about an axis concentric with the bearing hub 198 and connecting shaft 199. Since the bearing hub and connecting shaft are keyed together, the connecting shaft can become the drive shaft which carries the rotational energy thus created to the work.

It will become apparent further that by reversing operation of the machine, namely, by applying a mechanical force to the connecting shaft 199 causing it to rotate eccentric motion will be imparted to the core sleeve 206 and motor shaft. This in turn by well-known electric phenomenon will cause a generating of three-phase electric current in the coils 202, 203 and 204. Essentially the machine will serve as an A. C. generator when operated in reverse except for electrical refinements in handling magnetic and electric phases of the device, which refinements are well known to those skilled in the art.

The A. C. motor described in the foregoing paragraphs is particularly simple in its construction and contains a relatively small number of parts. It makes possible immediate speed reduction inherent in the motor so that readily available alternating current can be made use of as a direct drive for slow speed mechanical devices.

There has accordingly been described herein a mechanism which is especially advantageous in taking full advantage of high speed electric rotation and its accompanying efficiency while at the same time producing within the machine itself a relatively low speed mechanical rotation. The mass of the machine is kept to a relative minimum as compared with conventional machines. Fewer moving parts are required to produce the same mechanical work and moreover by reason of relatively slow motion of the mechanical parts, these parts become more simple to construct and are capable of operating for long periods of time without necessitating servicing and rebuilding to any appreciable degree.

While I have herein shown and described my invention in what I have conceived to be the most practical and preferred embodiment, it is recognized that departures may be made therefrom within the scope of my invention, which is not to be limited to the details disclosed herein but is to be accorded the full scope of the claims so as to embrace any and all equivalent devices.

Having described my invention, what I claim as new and desire to secure by Letters Patent is:

1. An alternating current electric motor for multiple phase alternating current comprising a motor frame, a drive shaft rotatably mounted on the frame, and a magnetic actuator for the drive shaft comprising a plurality of radially extending pole pieces spaced circumferentially about the axis of the drive shaft, inner ends of said pole pieces being spaced circumferentially about the drive shaft and defining the surface of a cylindrical chamber of predetermined diameter, electric coils around said pole pieces corresponding to the respective phases of said current, a direct current field coil around each pole piece, a hollow shaft of magnetic material smaller in diameter than said cylindrical chamber and adapted to progress around the chamber in response to magnetic changes in said pole pieces, a circular rack at the inside of the frame, means for translating eccentric rotation of the hollow shaft to concentric motion of the drive shaft comprising a circular rack at each end of the frame, a gear cage keyed to each end of the hollow shaft having one gear smaller in diameter than the rack meshing with and supported by the rack, a second concentric gear of smaller diameter than said one gear, a counter-balance weight on said cage, a sleeve keyed to each end of the drive shaft having an internal circular rack concentric with the drive shaft, said internal circular rack being larger in diameter than said second gear and smaller in diameter than said first identified rack and in meshing relation to the second gear whereby eccentric rotation of the hollow shaft is translated into concentric rotation of the drive shaft.

2. An alternating current electric motor for multiple phase alternating current comprising: a motor frame; a drive shaft rotatably mounted on the frame; a magnetic actuator for the drive shaft comprising a plurality of radially extending pole pieces spaced circumferentially about the axis of the drive shaft, inner ends of said pole pieces being spaced circumferentially about the drive shaft and defining the surface of a cylindrical chamber of predetermined diameter; electric coils around said pole pieces corresponding to the respective phases of said current; a hollow shaft of magnetic material smaller in diameter than said cylindrical chamber and adapted to progress around the chamber in response to magnetic changes in said pole pieces; a pair of annular circular tracks at the inside of the frame and coaxial with said chamber one at each end of said cylindrical chamber; of the drive shaft comprising a circular rack at each end of the frame, a pair of hollow shaft drum means, one keyed to each end of the hollow shaft and each being smaller in diameter than said track and adapted to roll therein as said hollow shaft progresses around said cylinder in response to magnetic changes in said pole pieces; and means to absorb eccentric rotation of said drum means and operably connected to said drive shaft whereby to transfer rotational motion of said hollow shaft to rotational motion of said drive shaft.

3. An alternating current motor as described in claim 2, which includes a pair of counterweights, one of said counterweights being disposed at each end of said hollow shaft, and each of said counterweights being provided with a pair of bearings, one coaxially with said drive shaft and mounted thereon, and the second coaxially with said hollow shaft and mounted thereon, whereby said counterweight is forced to rotate about said drive shaft axis on a side opposite the center of gravity of said hollow shaft.

4. An alternating current electric motor for multiple phase alternating current comprising: a motor frame; a drive shaft rotatably mounted on the frame; a magnetic actuator for the drive shaft comprising a plurality of radially extending pole pieces spaced circumferentially about the axis of the drive shaft, inner ends of said pole pieces being spaced circumferentially about the drive shaft and defining the surface of the cylindrical chamber of predetermined diameter; electric coils around said pole pieces corresponding to the respective phases of said current; a hollow shaft of magnetic material smaller in diameter than said cylindrical chamber and adapted to progress around the chamber in response to magnetic changes in said pole pieces; a pair of annular circular tracks at the inside of the frame and coaxially with said chamber one at each end of said cylindrical chamber; of the drive shaft comprising a circular rack at each end of the frame, a pair of hollow shaft drum means, one keyed to each end of the hollow shaft and each being smaller in diameter than said track and adapted to roll therein as said hollow shaft progresses around said cylinder in response to magnetic changes in said pole pieces; a pair of drive shaft drum means, coaxial with said drive shaft and mounted on said drive shaft on each end thereof, and axially separated from said pole pieces by said hollow shaft drum means; and a drum means integral with each of said hollow shaft drum means, and having an external diameter smaller than the internal diameter of said drive shaft drum means, and adapted to engage the interior surface of said drive shaft drum means to translate eccentric motion of said hollow shaft drum means to rotational motion of said drive shaft drum means.

References Cited in the file of this patent

UNITED STATES PATENTS

| | | |
|---|---|---|
| 586,823 | Patten | July 20, 1897 |
| 1,495,784 | Fereday | May 27, 1924 |
| 2,275,827 | Plenser | Mar. 10, 1942 |
| 2,378,668 | Vickers | June 19, 1945 |
| 2,413,805 | Vickers | Jan. 7, 1947 |
| 2,454,359 | Vickers | Nov. 23, 1948 |
| 2,561,890 | Stoddard | July 24, 1951 |
| 2,703,370 | Steensen | Mar. 1, 1955 |

FOREIGN PATENTS

| | | |
|---|---|---|
| 233,460 | Switzerland | Nov. 1, 1944 |
| 697,371 | Great Britain | Sept. 23, 1953 |
| 902,883 | Germany | Jan. 28, 1954 |